United States Patent [19]
Korthuis

[11] Patent Number: 5,666,796
[45] Date of Patent: Sep. 16, 1997

[54] BEATER ROD ASSEMBLY AND METHOD FOR A MOBILE HARVESTING MACHINE

[75] Inventor: Donald L. Korthuis, Lynden, Wash.

[73] Assignee: Korvan Industries, Inc., Lynden, Wash.

[21] Appl. No.: 488,973

[22] Filed: Jun. 8, 1995

[51] Int. Cl.$^6$ .................................................. A01D 46/00
[52] U.S. Cl. ................... 56/330; 56/DIG. 2; 56/DIG. 19; 460/113
[58] Field of Search ................. 56/330, 331, 328.1, 56/340.1, DIG. 2, DIG. 19; 460/113

[56] References Cited

U.S. PATENT DOCUMENTS

| | | | |
|---|---|---|---|
| 4,205,926 | 6/1980 | Carlson | 166/68 X |
| 4,418,521 | 12/1983 | Orlando et al. | 56/330 |
| 4,490,727 | 12/1984 | Kowols | 343/895 |
| 4,974,404 | 12/1990 | Korthuis et al. | 56/330 |

*Primary Examiner*—Terry Lee Melius
*Attorney, Agent, or Firm*—Robert B. Hughes; Hughes, Multer & Schacht

[57] ABSTRACT

A beater rod assembly for a crop harvesting machine where the beater rods rotate into and out of a crop row as the harvesting machine moves along the crop row. Each beater rod comprises an elongate fiberglass core surrounded by polyethylene sheath that exerts compressive forces radially inwardly around the fiberglass core. This arrangement alleviates damage to the fiberglass core that would otherwise occur by the tip end of the rod engaging posts or possibly engaging the tip end of another rod.

18 Claims, 3 Drawing Sheets

FIG. 4A-B

BEATER ROD ASSEMBLY AND METHOD FOR A MOBILE HARVESTING MACHINE

BACKGROUND OF THE INVENTION a. Field of the Invention

The present invention relates to the harvesting of agricultural produce, and more particular to the harvesting of berries and similar products which are removed from the bushes or other plants by means of oscillating beating rods which engage the plant to remove the berries or other produce. More particularly, the present invention relates to the beater rod assembly for such harvesting machines, and more particularly to a beater rod configuration.

b. Background Art

For centuries, berries and other similar crops have been grown in crop rows, and the harvesting of the berries or other produce has been a manual operation. In recent decades, there have been developed harvesting machines which travel down the crop rows to harvest the berries mechanically. One method of accomplishing this is to provide the harvesting machine with beater rod assemblies which have one or more beater rod assemblies, each of which comprises a vertical shaft having a plurality of beater rods along the length of the shaft, with these beater rods being angularly spaced so that they extend from the shaft around the entire 360° circumference of the shaft.

As the harvesting machine moves down the crop row, the beater rod assembly is positioned so that the shaft is adjacent to the outside lateral surface of the bush. The adjacent beater rods extend into the bush, and as the harvesting machine progresses down the crop row, the beater rods "walk" into and out of the bush. In addition, there is an oscillating motion superimposed over the rotational path of the beaters so that the oscillating motion of the rods within the bush enhances the removal of the berries. The interior ends of the rods are fixedly mounted to the shaft, and these rods have some degree of flexibility. However, they are sufficiently stiff so as to be able to impact the plants with sufficient force to enhance removal of the berries without damaging the bush itself.

Also, in recent decades, fiberglass construction and other composition structures involving high strength to weight ratios have been used in a great variety of applications. There have been attempts to incorporate fiberglass materials in beater rods. This is accomplished by the glass fibers being arranged in a generally parallel elongate configuration, and the fibers are bonded together by a suitable material such as a mixture of silicon dioxide, aluminum oxide, and magnesium oxide.

One of the problems in utilizing fiberglass for beater rods is that under certain circumstances they are more likely to become damaged. In some instances, these are damaged simply by the rod breaking off from the shaft, generally near the root. In other instances, the fibers of the rod become loosened from one another so that the rod loses the required degree of stiffness.

Quite commonly, two beater rod assemblies are used in one harvesting machine, with these being positioned on opposite sides of the bush row. As the beater rods from the two assemblies extend into the crop row, the ends of the rods will overlap to some extent. If the length of overlap is relatively small (e.g. two inches), or relatively large (as great as eight inches), it is found that the interaction of the rods engaging each other has little damaging affect on the rods. However, an optimized positioning of the beater rod assembly is generally such that there is about a four inch length of overlap. Under these conditions, there appears to be a much higher amount of damage occurring. This would generally occur by the ends of the rods engaging one another to impart forces to the engaging rods that result in the loosening of the strands from one another or possibly breakage.

Another problem is that if there are posts in the crop row, one of the beater rods may have its end tip engage the post and thus cause the beater rod to become damaged.

It is toward these problems that the present invention is directed.

SUMMARY OF THE INVENTION

The present invention is directed toward a beater rod assembly, and more particularly toward a particular construction of the beater rods of such assembly where it is possible to utilize a fiberglass construction of the beater rod and yet avoid damage which would normally occur with such beater rods.

The beater rod assembly is adapted to be used in a harvesting machine, with the beater rod assembly comprising a central shaft means adapted to be positioned to a crop row, and also a plurality of beater rods mounted to the shaft means to extend radially outwardly from the shaft means and extend into the crop row as the harvesting machine travels along the crop row. The shaft means rotates so that the beater rods travel in a circular path into and out of the crop row.

Each of the beater rods comprises an elongate fiberglass core having a lengthwise axis. The core comprises a plurality of fibers extending along the lengthwise axis of the beater rod and bonded to one another. There is a sheath surrounding and closely engaging the core in a manner to constrain outward movement of the fibers of the fiberglass core.

Thus, the beater rods are able to come into engagement with objects in or adjacent to the crop row which would tend to damage the beater rods. However, the beater rods are able to better withstand such forces caused by such engagement to minimize such damage.

More particularly, the sheath tightly engages the core to exert radially inward forces against the core. In a preferred embodiment, the sheath is at least moderately resilient and tightly engages the core in a manner that tends to contract and thus exert compressive forces inwardly against the core.

Also, in the preferred embodiment, the sheath is applied to the rod at an elevated temperature and upon cooling contracts to exert radially inward compressive forces against the core.

In the preferred form, the sheath is made of polyethylene.

The invention also comprises the individual beater rods, as described above.

The method of the present invention comprises utilizing the beater rod assembly of the present invention, with the beater rods as described. The beater rod assembly is utilized in a harvesting machine to move along the crop row with the beater rods moving into and out of the crop row.

Other features of the present invention will become apparent from the following detailed description.

Figure 5:
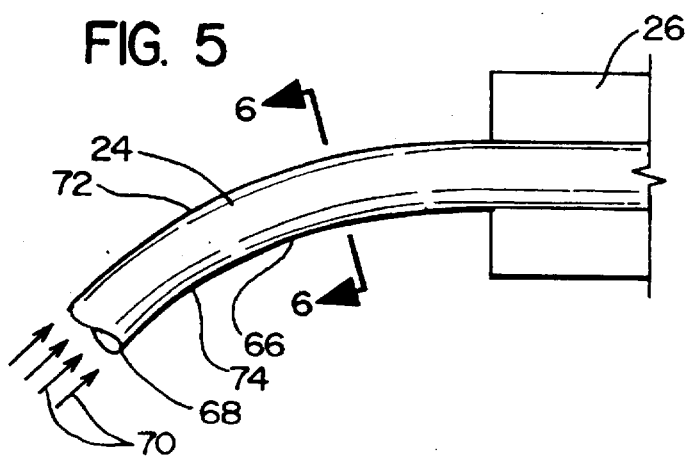
Figure 6:
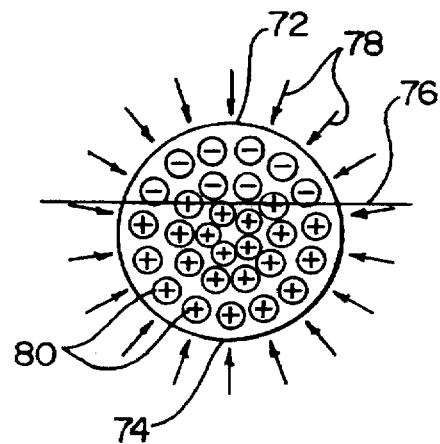

FIG. AB, 4C and 4D are somewhat schematic drawings showing the positions of the beater rod as it is deflected when it engages the stationary post, these figures showing sequentially the deflection of the rod;

FIG. 5 is a sectional view of a mounting disk with the beater rod mounted therein, showing a portion of the beater rod and the compressive forces exerted thereon; and FIG. 6 is a sectional view taken along line 6—6 of FIG. 5, and illustrating the manner in which the compressive and tensile forces are imparted to the rod.

DESCRIPTION OF THE PREFERRED EMBODIMENT

Figure 1:
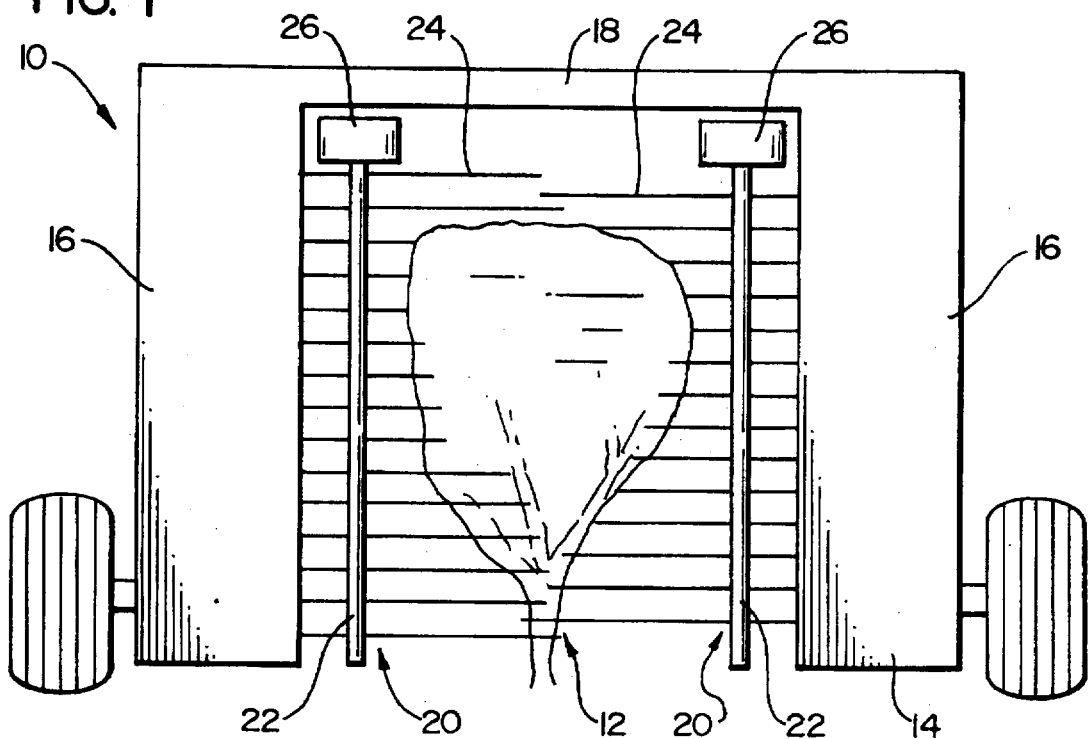
FIG. 1 is a semi-schematic front elevational view of a harvesting machine incorporating the present invention.

With reference to FIG. 1, there is shown a harvesting machine 10 in its operating position engaging its crop row 12. The machine 10 comprises a chassis 14 having two side sections 16 joined by a top middle section 18. There are two beater rod assemblies 20 positioned on opposite sides of the crop row 12. Each beater assembly 20 comprises a central elongate generally vertically aligned shaft 22, and a plurality of beater rods 24 positioned along the length of each shaft 22 and extending outwardly therefrom in an angularly spaced pattern so that these rods extend outwardly around the entire circumference of the shaft 22. There is also an oscillating drive mechanism 26 at the top end of each shaft. Such a drive mechanism can impart either (or possibly both) of a vertical oscillating motion or a laterally back and forth angular oscillating motion.

A typical harvesting machine 10 would include a number of other components. For example, the machine would be mounted on wheels. There would also be catch plates at the bottom of the machine to collect the berries and other produce and direct these onto a conveyor, with the conveyor carrying the berries to a collecting location. The machine 10 would be provided with a steering mechanism, and also motors to not only cause the machine 10 to travel, but also to supply power to the beater rods, belts and any other operating components of the machine 10. However, since the specific configuration or function of such components is not closely related to the present invention, a description of the same will not be included. The overall machine 10 could be similar to the one described in U.S. Pat. No. 4,974,404

Figure 2:
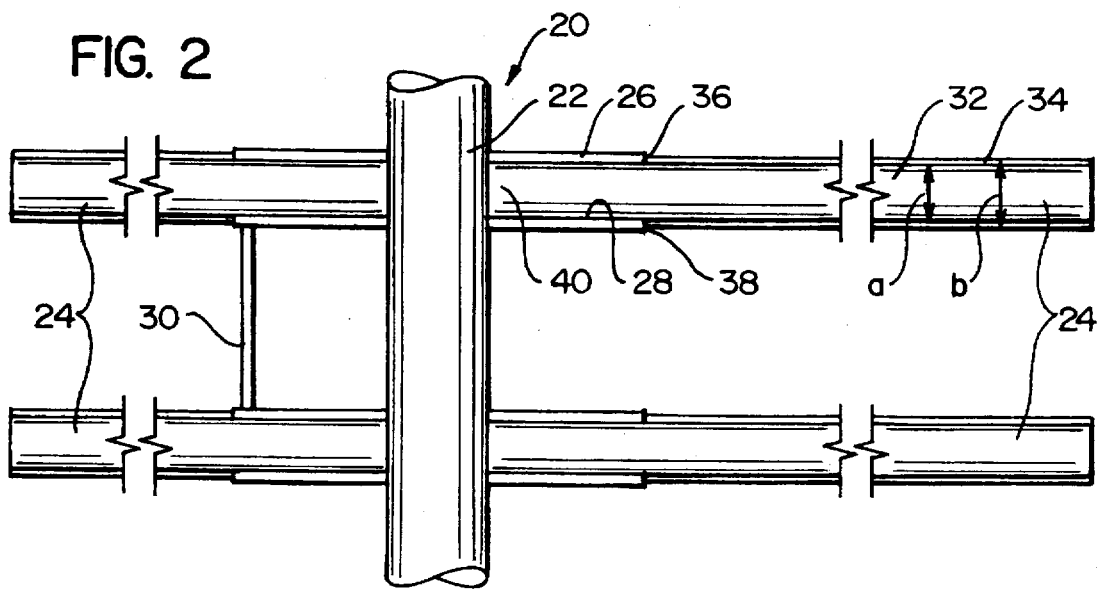
FIG. 2 is a side elevational view of a portion of a beater rod assembly incorporating the present invention.

A first embodiment of the present invention is shown in FIG. 2 where there is shown only part of one of the beater rod assemblies 20. Commonly, such a beater rod assembly 20 would have a shaft 22 between 4 to 7 feet in length, and there would be as many as 12 to 30 sets of beater rods 24, and individual rods could be spaced at vertical intervals of about ½" to 8' inches. Normally each set of beater rods would lie in the plane, with the rods 24 being evenly spaced from one another at angles of about 15–45 degrees.

In FIG. 2, there is shown only two pair of diametrically opposed rods 24 from adjacent sets of rods 24. For each set of rods 24, there is provided a mounting disk 26 fixedly attached to the shaft 22. Each disk 26 has a plurality of radially extending openings 28 to receive the inner end of the rod 24. As is common in the prior art, the mounting disks 26 are interconnected by vertical metal rods 30 which prevent wires that may be extending through the crop row 12 from being entangled in the beater rod assembly 20.

Each beater rod assembly 24 comprises an elongate fiberglass core 32 and a surrounding polyurethane sheath 34 surrounding and tightly engaging the length of the core 32. The fiberglass core 32 has a cylindrical configuration of uniform diameter, and the sheath 34 has a uniform thickness and also a regular annular configuration. In the present embodiment shown herein, the diameter of the core 32 (shown at "a") is about ⅜ inch, and the outside diameter of the sheath 34 (shown at "b") is about ½ inch.

The construction of the fiberglass core 32 is that it has a plurality of elongate glass fibers aligned parallel with one another, with these fibers being bonded to one another by a suitable bonding composition, such as a mixture of silicon dioxide, aluminum oxide and magnesium oxide. A typical fiberglass rod suitable for use in the present invention is one such as manufactured by Glasforms. The specification for this rod are as follows:

| DESIGN GUIDELINES FOR PULTRUDED COMPOSITES | | | | |
|---|---|---|---|---|
| Properties | Test Procedure | Solid Rod&Bar | Structural Profiles Longitudinal | Transverse |
| Glass content % by weight | ASTM D2584 | 75 | 65 | 47 | — |
| Tensile Strength, psi × $10_3$ | ASTM D3926/D638 | 120 | 100 | 42.2 | 10.1 |
| Tensile Modulus psi × $10_6$ | ASTM D3916/D638 | 6.0 | 5.5 | 2.66 | 1.05 |
| Flexural Strength psi × $10_3$ | ASTM D4476/D790 | 120 | 100 | 64.6 | 21.4 |
| Flexural Modulus psi × $10_6$ | ASTM D4476/D790 | 6.0 | 5.5 | 2.09 | 1.24 |
| Compressive Strength psi × $10_3$ | ASTM D696 | 70 | 60 | 26.26 | — |
| Barcol Hardness | ASTM D2583 | 60 | 50 | 50 | — |
| Izod Impact,ft-lb/in. | ASTM D256 | 40 | 40 | 40 | — |
| Specific Gravity | ASTM D792 | 2.0 | 1.9 | 1.72 | — |
| Density lbs/$in_3$ | ASTM D792 | .073 | .069 | .062 | — |
| Water Absorption,% (weight increase after 24 hours immersion) | ASTM D570 | .05 | .10 | .70 | — |
| Coefficient of Thermal Expansion in/in/°C. × $10_6$(Axial) | ASTM D696 | 5.3 | — | — | — |
| Dielectric Strength volts/mil (Method A, type 3 electrode) | ASTM D149 | 200 | — | — | — |
| Dielectric Strength kv/in (Method A, type 1 electrode) | ASTM D149 | 60 | — | — | — |
| Dielectric Constant, 60 Hz | ASTM D150 | 5.4 | — | — | — |
| Arc Resistance, seconds | ASTM D495 | 140 | — | — | — |

-continued

DESIGN GUIDELINES FOR PULTRUDED COMPOSITES

| Properties | Test Procedure | Solid Rod&Bar | Structural Profiles Longitudinal | Transverse |
|---|---|---|---|---|
| Volume Resistivity ohm-cm × $10_{14}$ | ASTM D257 | 2.5 | — | — — |

The supplier of this rod indicates that the data given above is representative of a specific formula and not typical of all custom formulated products. The information given is based on data received of others and is presented with every belief in its accuracy.

TYPICAL PHYSICAL PROPERTIES OF THE POLY ETHYLENE FORMING THE SHEATH

| Property (determined on compression molded specimen) | Test Method | Typical value |
|---|---|---|
| Mechanical Properties | | |
| Tensile Strength (break), psi | D638 | 4500 |
| Ultimate Elongation, % | D638 | 850 |
| Flexural Modulus, psi | D780 | 120,000 |
| Tensile Strength (yield), psi | D638 | 3200 |
| Thermal Properties | | |
| Brittleness Temperature, °C. | D746 | <−100 |
| Melt Index, g/10 minutes | D1238 cond. E | 0.10 |
| High Lead Melt Index, g/10 minutes | D1238 cond. F | 12 |
| DSC Induction Temperature, °C. | D3350 | >250 |
| DSC Induction Time, minutes at 210° C. (100% oxygen) | Union Carbide | 25 |
| Melting Point, °C.[A] | Union Carbide | 127 |
| Crystallization Point, °C.[A] | Union Carbide | 113 |
| Vicat Softening Temperature, °C. | D1525 | 121 |
| Miscellaneous Properties | | |
| Density, g/cm³ (base resin) | D1505 | 0.944 |
| Density, g/cm³ (compound) | D1505 | 0.954 |
| Environmental Stress Crack Resistance[B], hours | D1693 cond. C | >2000 |
| Thermally Aged Environmental Stress Crack Resistance, [B], hours | D1693 cond. C | >2500 |
| Durometer Hardness, Shore "D" | D2240 | 58 |
| Linear Thermal Coefficient of Expansion, in/in/°C. (−30° C. to 30° C.) | D696 | $1.4 \times 10^{-6}$ |
| Izod Impact, ft-lbs/in notch at 23° C. | D256 | 3.0 |

[A] Heating & cooling rates at 10° C./min
[B] Plaque first aged 10,000 hours in water at 80° C.

TEST METHODS

Designated tests are made in accordance with current issues of ASTM Standard Testing Methods. Copies of these are available from the American Society for Testing and Materials, 1916 Race Street, Philadelphia, Pa. 19103, on request. The Union Carbide methods are available upon request.

PROCESSING

UNION CARBIDE Polyethylene Compound DGDB-2480 Black 4865 can be readily processed by any of the current pipe extrusion methods in all pipe sizes at rates considered commercially acceptable. However, to ensure proper plastication and performance of the product we recommend the following key points be adhered to, closely. The extruder should be equipped with a high quality high density polyethylene screw (preferably a barrier type to insure complete melting), as well as a melt thermocouple and pressure gage for control.

The sheath 34 can be made of a variety of materials which are sufficiently tough to withstand the repeated contact and rubbing against the bushes. One such material is polyethylene. A polyethylene manufactured by Glasforms Company has been found to be acceptable. The typical physical properties of this polyethylene are given above.

The polyethylene sheath 34 is usually bonded to the core 32 as the core is being extruded from a forming machine. The polyethylene coating is applied to the exterior surface of the core and is then passed through a Die extrusion tool which forms the polyethylene as a uniform coat around the core 32 at a thickness of about 1/16th of an inch. The polyethylene sheath is applied while it is hot, and as it hardens and cools, the sheath 34 contracts around the core 32 to apply a compressive force to the core 32. The inside edge of the sheath 34 ends at 36 adjacent to the outer surface 38 of the mounting disk 26. The inner end 40 of the fiberglass core 32 is then press fitted into the opening 28 of the disk 26.

It has been found that in using the beater rod construction described above, there has been a remarkable decrease in breaking or other damage of the fiberglass core 32, in comparison to the breakage or damage occurring when the rod is made entirely of fiberglass. One of the difficulties in finding a solution is that it is difficult to observe what exactly is taking place when one of the beater rods breaks or is being damaged. There can be as many as 800 beater rods in a single beater rod assembly. In operation, these rods are moving into the plant and the beater rods in the plant are almost totally obscured by the leaves of the plant. Further, there is the oscillating motion imparted to the beater rods which makes observation very difficult.

Nevertheless, it is believed the following hypothesis for the reason for the breakage of the fiberglass rods and why the present invention will solve this can be given.

As a first step in analyzing the problem, reference is made to FIG. 3A through 3D. It is believed that the lateral impact of the fiberglass beater rods against the bushes probably has only a minor effect in the breakage. It is further believed that one major cause of damage is due more to the outer tip of the rod coming into contact with a stationary object which would deflect this rod in some manner. This could occur, for example, when one of the beater rods comes into end contact with a stationary post that is positioned along the crop row to hold wires. Another major source of damage is believed to occur when the end tips of two beater rods from two beater assemblies on opposite sides of the bush collide with one another so that the end surfaces abut each other.

The occurrence of the beater rod coming into contact with an object such as a post is analyzed first with reference to FIGS. 3A through 3D.

There is represented somewhat schematically, a single beater rod 24 positioned in a disk 26. It is important to note that the inner root portion 40 of the rod necessarily is fixed relative to the disk 26, the reason for this being that the shaft 22 oscillates, and this oscillating movement must be imparted to the rod 24.

Also, to analyze the motion of any one rod 24, it is necessary to recognize the manner in which the rod enters the crop row as the machine is moving forwardly. When the rod is extending forward, it is out of the crop row. As it enters the crop row as the harvesting machine moves forwardly and the beater assembly 20 rotates, the rod 24 is moving rearwardly relative to the harvesting machine. However, since the harvesting machine is moving forward, the rod itself has both a forward movement (at least for portions of the rod) relative to the stationary crop row. Since the rod 24 is changing its angular position relative to the crop row, it turns out that there is generally a neutral axis where one part of the beater rod 24 remains nearly stationary relative to the crop row. This point can be possibly at the ¾ length of the beater rod when it is extending laterally at 90° to the crop row. In FIGS. 3A through 3D, this axis is represented at 42. The center of the crop row is illustrated at 44.

Figure 3A:
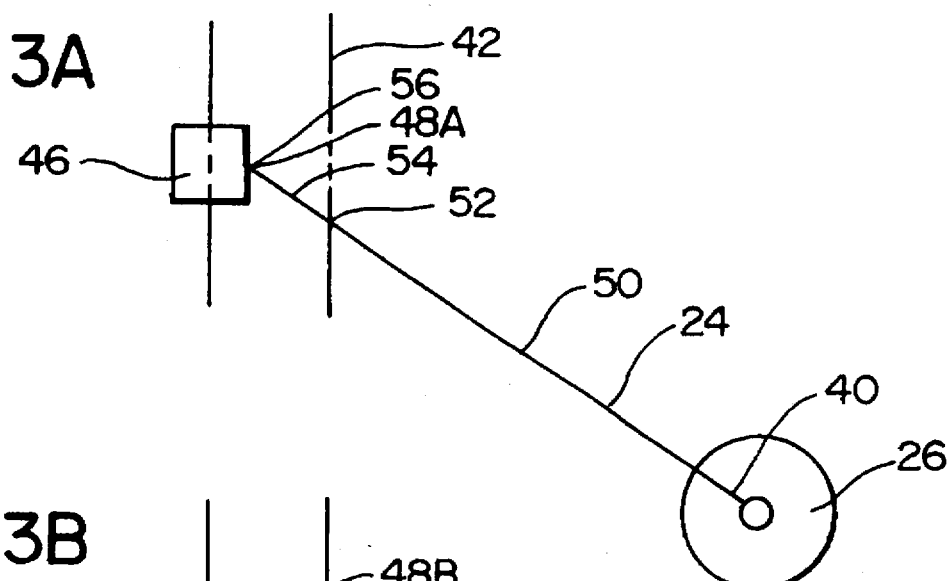
FIGS. 3A, 3B, 3C, and 3D are schematic top plan views showing in sequence the position of a beater rod relative to a stationary post in the crop row, where the position of the beater rod is shown relative to the post where there would be no engagement with the post, this being done for purposes of illustration.

For purposes of analysis, let us assume there is post 46 on the crop row and that the rod 24 engages the post 46. This occurrence is illustrated at FIG. 3A, and the point of engagement is at 48. While there may be a certain amount of give to the post 46, for purposes of this analysis, we'll assume that the post 46 remains stationary. Further, it will be assumed that there is sufficient frictional engagement of the end tip of the rod 24 with the post 46 or that the tip of the rod digs into the wooden post to some extent so that the point of contact at 48 remains the same.

Figure 3B:
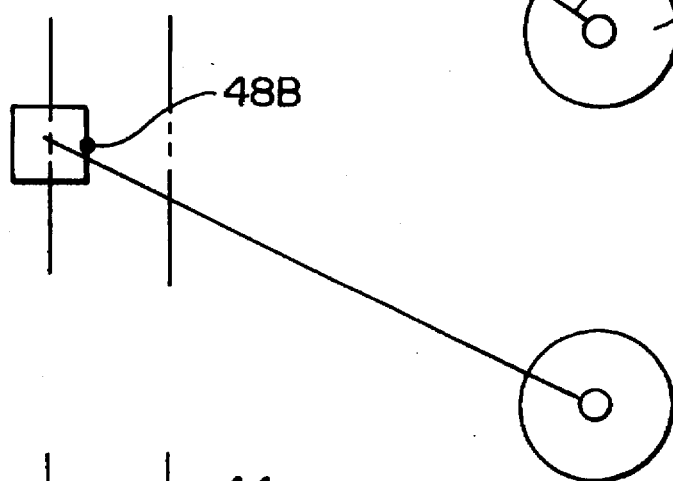
Figure 3C:
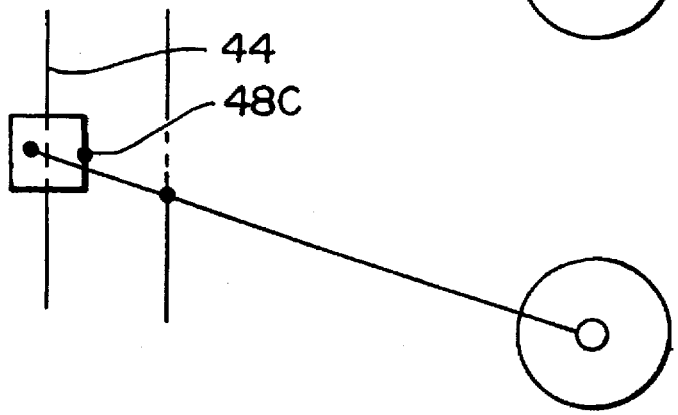
Figure 3D:
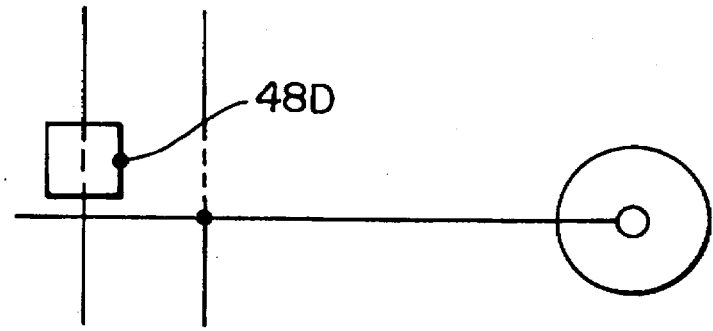

In FIGS. 3B, 3C and 3D, the rod 24 is shown in broken lines at the location where the rod 24 would travel if it had not engaged with the post. Then the actual point of engagement is shown at 48A, 48B, 48C and 48D to show how the tip of the rod is moved because of its engagement with the post 46. To comment on where the rod 24 would go if there were no engagement with the post, it has to be recognized that the inside portion 50 of the rod is actually moving forward about an approximate location of 52 where the rod crosses the neutral axis 52. The outer portion 54 of the rod is actually rotating about the point 52 so that the tip 56 of the rod would move somewhat rearwardly relative to the crop row, assuming there is no engagement with the post 46. It can be seen that the post is pushing the end top of the rod 56 radially inwardly toward the disk 46 and also is bending the rod a short distance in a forward direction, relative to the location that the rod 24 would be at if there were no engagement with the post 45.

Now reference is made to FIG. 4A-B. The reason for the 4A-B designation is that this represents the rod 24 shown as a solid rod in its position of FIG. 4A relative to engagement with a solid object. The rod shown at 24B is how the rod would be deflected as the harvesting machine moves forwardly and the rod 24 is at the position of FIG. 3B.

First, let's analysis the force which is being exerted by the post 46 against the rod tip 56 to move it from 56A to 56B, with 56B coinciding with the point of contact 48B with the post. The force which the post 46 exerts is both a compressive load, and also a slight bending force to rotate the rod tip in a forward direction. At this point, it should be kept in mind that the rate of rotation of the entire beater assembly is dictated substantially entirely by the engagement of the full array of rods 24 into the bush. Further, with the disk 26 being fixedly connected to the shaft 22, the rod 24 is in a sense a small cantilever beam anchored at the disk 26.

Figure 4C:
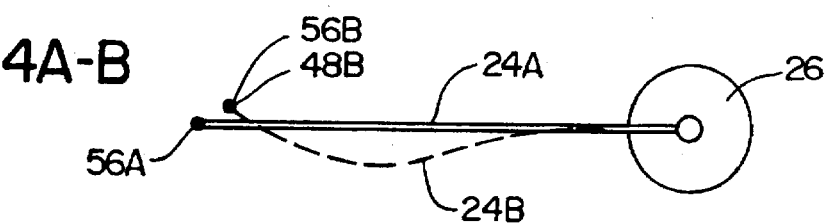
Figure 4C:
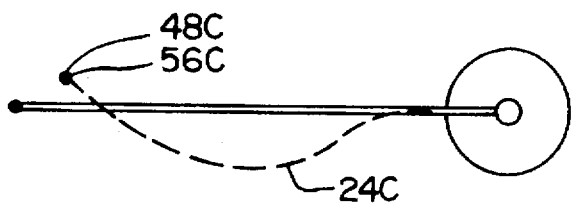

FIG. 4C illustrates the end tip 56C of the rod being moved to the location at 48C. The configuration of the rod in this position is shown in 24C. Finally, in FIG. 4D, the configuration of the rod 24D is shown in the position the rod assumes when the tip of the rod is at 56D.

The position of the rod 24 at various stages as shown in FIGS. 4A-B, 4C and 4D were arrived at partly analytical and partly empirical. The rod 24 was considered as a cantilever beam which is being simultaneously pressed toward its root location where it is mounted and also being pushed laterally to some extent. In that instance at the root location of the rod 24, the alignment of the rod 24 is fixed. If there is no inward movement of the rod tip, the rod would simply be deflected in a curved configuration forwardly However, the simultaneous application of the compressive force and the inward movement causes the rod to take something of a bow shape as shown in FIGS. A-B, 4C and 4D.

These curves were arrived at somewhat empirically, also, by taking a length of somewhat stiff yet resilient piece of twine which resists bending. A length of this twine was cut to the length of the rod 24 shown in FIGS. 4a-B, C and D, and the root end of the twine was placed at the location of the disk 24. Then the end top of the twine was moved as shown in FIGS. 4A-B, C and D. The resilient twine piece would take a configuration generally shown in FIGS. 4A-B, 4C and 4D. The force exerted by the post 46 against the rod tip at 56D is represented approximately by the arrow 58 in FIG. 4D. (It should be noted that the direction of the arrow 58 was not calculated with precision. However, it is believed to be approximately representative of result in force component.

With regard to the forces along the length of the rod 24, let us first look at the lateral force component 60, this being the compressive force directed from the post 46 toward the hub 26. This compressive force has to be reacted into the root end 40, and thus into the hub 26. This means there will be a compressive load exerted entirely along the length of the rod 24 tending to compress the fibers in the fiberglass rod 24. Superimposed over this compressive load are the bending loads. It is evident that at each place where there is a curve in the rod 24, the glass fibers on the convex side of the curve will be subject to a tensile force, while those on the concave side of the curve will be subject to a compressive force. Thus at the curved location 64 on the rod 24, the fibers on the backside of the rod 24 will be stretched. It can also be seen that at the curved location 66, the fibers on the backside of the rod 24 will be compressed. There is some intermediate location at 68 where the fibers will not feel any bending movement, and there will be simply a compressive load.

As indicated above, it has been found that if the fiberglass rod (without the sheath 34) is employed as a beater rod, there is relatively high percentage of damage to the rod. Yet, when the rod is made as having a fiberglass core 32 and the sheath 34, the damage is reduced remarkably, as much as a 95 to 99 percent reduction.

Figure 4D:
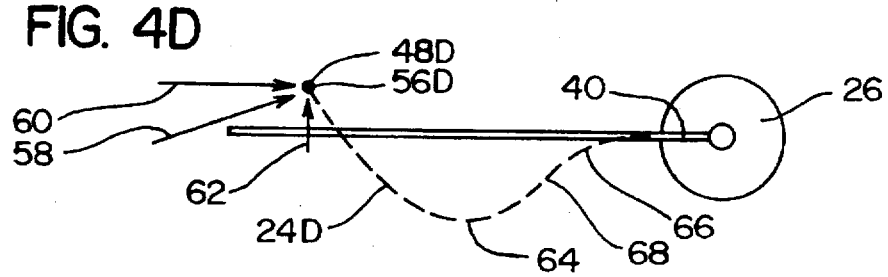

One may be tempted to say that this is simply because the fact some of the compressive or bending loads transmitted from the posts are resisted by the sheath 34. However, since the position of the hub 36 and the position of the post are dictated, whether the fiberglass rod has the benefit of the surrounding sheath of not, it will necessarily have to assume the same configuration as is shown in FIG. 4D. If the fiberglass rod itself assumes that configuration, regardless of the forces which any other member is exerting against the post 46, the fiberglass rod will still feel these same stresses.

To analyze this further, reference is made to FIG. 5, which shows only the inner portion of the rod 24. For purposes of analysis, the rod 24 is considered as only being the fiberglass core 32, without the sheath 34. As indicated previously, at the transition point 68, since there is no bending in the rod 24, the fibers in the glass rod do not feel any bending moments at the location 68, but only the compressive force, indicated by the arrows at 70. If there were no compressive force at 70, and the rod section 66 were simply subjected to a bending moment, then the strands on the forward side 72 would be placed in tension, while the strands on the lower side 74 would be placed in compression. There would be a neutral axis where there would be no bending loads somewhere along the center line of the rod section 66.

However, when we now superimpose the compression loads, the fibers in the section 66 must exert a net linear force along the length of the rod section 66 equal and opposite to the compression load 70. This means that the fibers nearer the lower part 74 which are already in compression will be in yet greater compression, while the fibers on the forward side at 72 which would be expected to have tensile loading would have such tensile loads reduced, or even eliminated, if the compressive forces 70 were great enough.

In analyzing the failure of the fiberglass beater rods (without the sheath 34) it was found that a rather high degree of the failures occurred in the section of the rod within about one to nine inches from the hub 26. Further, the fibers would be pulled apart from one another on the backside of the rod section 66, as indicated at 74). When these fibers proximate the location 74 would simply break their bonds and become a group of loose fibers, instead of the rod 24 being rather stiff adjacent the hub 26, it would become much more bendable (more closer to becoming a piece of spaghetti. Unfortunately, this failure would oftentimes go unnoticed unless the farmer or operator of the harvesting machine would inspect the beater rods 24 more closely.

To analyze the manner in which the loads are imparted into the rod sections 66 further, reference is not made to FIG. 6. There is shown a neutral axis 76 where the fibers that are in compression are below the line 76 and given plus lines, and the fibers above being in tension and given minor signs. The fibers at the lowermost part of FIG. 6 (at the rear surface of section 66) would have the highest compression loading. It is surmised that the failure would occur by the highly compressed outer fibers closer to the back location would tend to bow outwardly and break the adhesive bond, thus becoming lose strands. This would reduce the capability of the rod section 66 to withstand these compressive loads, and cause successive failure of additional bonds of the other rods in compression.

What then would be the function of the sheath 34? It is believe it can be stated that with reasonable justification that with the sheath 34 being applied hot to the fiberglass rod and then cooling, it provides a compressive force which would be exerted uniformly around the circumference of the rod section 66. Such compressive force is indicated by the arrows 78 surrounding the entire perimeter of the cross sectional view of FIG. 6. With the strands of fiberglass in the core 32 feeling high compressive loads, the radially inward compressive forces would help maintain the individual fiberglass strands 80 in alignment to reduce the likelihood of bonds being broken between the fibers 80.

As indicated above, it is believed that the hypotheses given above can be given with reasonable justification. However, whether or not the above hypothesis is correct, it has been found that in forming the beater rods as described above, the damage to the beater rods has been significantly reduced.

As indicated previously, another source of damages is where two rods from oppositely positioned beater assemblies have their end tips abut against one another so that as the beater assemblies continue their rotation, the rods push against each other with an increasing force. One type of damage which can occur in this situation is that the ends of the rods will actually be split in some manner. This is believed to occur by the ends of the fibers of the two rods slipping between each other so as to cause a splitting action. It is surmised that the use of the polyethylene sheath exerting the inward compression force around the fibers have a substantial effect of alleviating this type of splitting.

Another form of damage can occur when the rods of opposite beater rod assemblies engage each other end to end is that this will likely result in a bending action of the rods to cause damage. It can be surmised with reasonable justification that the outer portions of the bushes that are closer to the middle portion or radially inward portions of the rod tend to push the middle or radially inward part of the rod rearwardly. The reason for this is that the forward motion of the harvesting machine would have a greater velocity than the relative rearward movement of the central and radially inward portions of the rod. Therefore, the bushes would exert a rearward force tending to bend the rod rearwardly.

On the other hand, the outer tip of the rod would be subjected to the compressive load of the opposing rod which it is engaging end to end. It is surmised (and it is believed this is done with reasonable justification) that the same type of bending of the rod would occur as described above, with reference to FIG. 3A through D and 4AB through 4D.

Also, as indicated above, whether or not these hypothesis are correct, only partially correct, or have no validity at all, it has been found that by using the present invention the damage to the beater rods has dramatically diminished.

It is to be understood that the preferred embodiment described herein is simply exemplary of the present invention, and that variations could be made without departing from the basic teachings of the present invention.

Now therefore I claim:

1. A beater rod assembly for a harvesting machine, said assembly comprising:
   a. a central shaft means adapted to be positioned adjacent to a crop row;
   b. a plurality of beater rods mounted to the shaft means to extend radially outwardly from the shaft means and extend into the crop row as a harvesting machine travels along the crop row, with the shaft means rotating so that the beater rods travel in a circular path into and out of the crop row;
   c. each of said beater rods comprising;
      i) an elongate fiberglass core having a lengthwise axis, said core comprising a plurality of fibers extending along the lengthwise axis and bonded to one another;
      ii) a sheath surrounding and closely engaging the core in a manner to constrain outward movement of fibers of said fiberglass core, whereby said beater rods are able to come into engagement with objects in or adjacent to the crop row which would impose forces to tend to damage the beater rods, with said beater rods being able to better withstand the forces caused by said engagement to minimize such damage.

2. The assembly as recited in claim 1, wherein said sheath tightly engages the core to exert radially inward force against said core.

3. The assembly as recited claim 1, wherein said sheath is at least moderately resilient and tightly engages said core in a manner to tend to contract and thus exert compressive forces radially inwardly against said core.

4. The assembly as recited in claim 1, where said sheath is applied to said rod at an elevated temperature, and upon cooling contracts to exert radially inward compressive forces against said core.

5. The assembly as recited in claim 4, wherein said sheath is made of polyethylene.

6. The assembly as recited in claim 1, wherein said sheath tightly engages said core so as to exert a radially inward compressive force against said core, said sheath being made of polyethylene.

7. A beater rod adapted to be mounted in a beater rod assembly for a harvesting machine, where said beater rod assembly comprises:

a. a central shaft means adapted to be positioned adjacent to a crop row;
   b. a plurality of beater rods mounted to the shaft means to extend radially outwardly from the shaft means and extend into the crop row as a harvesting machine travels along the crop row, with the shaft means rotating so that the beater rods travel in a circular path into and out of the crop row;

said beater rod comprising:
      i) an elongate fiberglass core having a lengthwise axis, said core comprising a plurality of fibers extending along the lengthwise axis and bonded to one another;
      ii) a sheath surrounding and closely engaging the core in a manner to constrain outward movement of fibers of said fiberglass core, whereby the beater rod is able to come into engagement with objects in or adjacent to the crop row which would impose forces to tend to damage the beater rod, with said beater rod being able to better withstand the forces caused by said engagement to minimize such damage.

8. The beater rod as recited in claim 7, wherein said sheath tightly engages the core to exert radially inward force against said core.

9. The beater rod as recited claim 7, wherein said sheath is at least moderately resilient and tightly engages said core in a manner to tend to contract and thus exert compressive forces radially inwardly against said core.

10. The beater rod as recited in claim 7, where said sheath is applied to said rod at an elevated temperature, and upon cooling contracts to exert radially inward compressive forces against said core.

11. The beater rod as recited in claim 10, wherein said sheath is made of polyethylene.

12. The beater rod as recited in claim 1, wherein said sheath tightly engages said core so as to exert a radially inward compressive force against said core, said sheath being made of polyethylene.

13. A method of harvesting in a crop row, said method comprising:

a. providing a harvesting machine having a beater rod assembly comprising:
      i) a central shaft means;
      ii) a plurality of beater rods mounted to the shaft means to extend radially outwardly from the shaft means
      iii) each of said beater rods comprising:
         1. an elongate fiberglass core having a lengthwise axis, said core comprising a plurality of fibers extending along the lengthwise axis and bonded to one another;
         2. a sheath surrounding and closely engaging the core in a manner to constrain outward movement of fibers of said fiberglass core,
   b. positioning said beater rod assembly adjacent to said crop row so that the beater rods extend radially outwardly from the shaft means extend into the crop row;
   c. moving said harvesting machine along the crop row with the shaft means rotating so that the beater rods travel in a circular path into and out of the crop row, whereby said beater rods are able to come into engagement with objects in or adjacent to the crop row which would impose forces to tend to damage the beater rods, with said beater rods being able to better withstand the forces caused by said engagement to minimize such damage.

14. The method as recited in claim 13, wherein said sheath tightly engages the core to exert radially inward force against said core.

15. The method as recited claim 13, wherein said sheath is at least moderately resilient and tightly engages said core in a manner to tend to contract and thus exert compressive forces radially inwardly against said core.

16. The method as recited in claim 13, where said sheath is applied to said rod at an elevated temperature, and upon cooling contracts to exert radially inward compressive forces against said core.

17. The method as recited in claim 16, wherein said sheath is made of polyethylene.

18. The method as recited in claim 13, wherein said sheath tightly engages said core so as to exert a radially inward compressive force against said core, said sheath being made of polyethylene.

* * * * *